Patented June 16, 1936

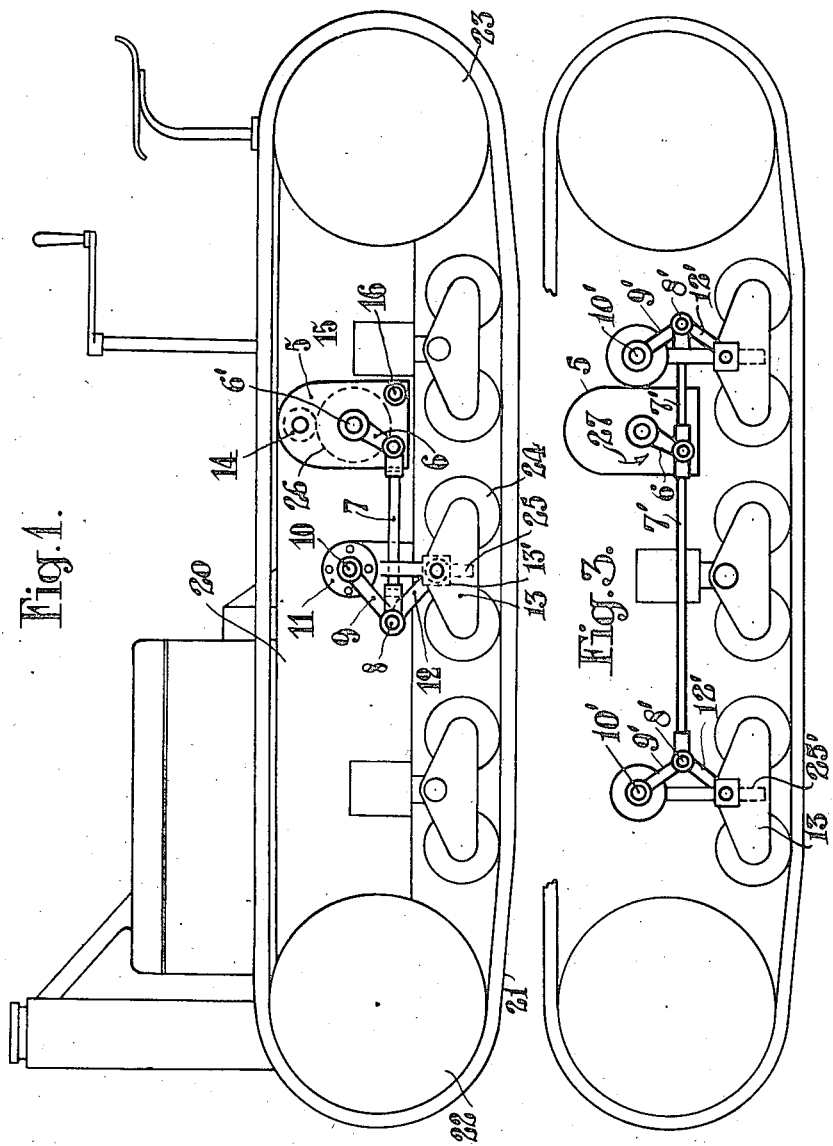

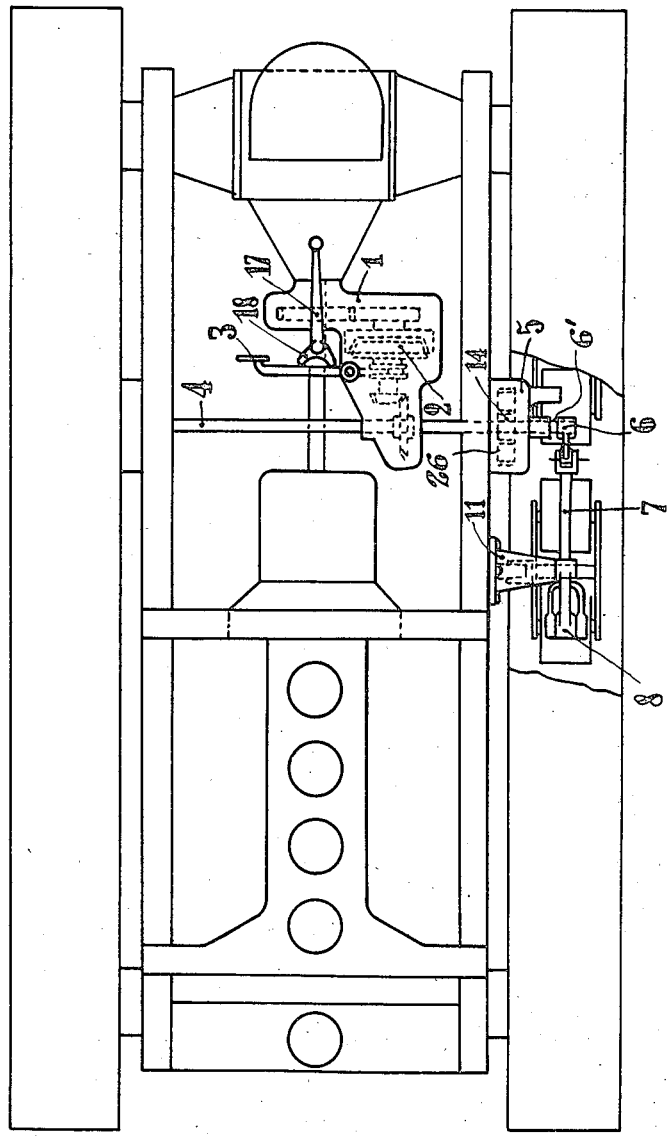

2,044,307

UNITED STATES PATENT OFFICE 2,044,307

ENDLESS TRACK VEHICLE

Adolphe Kégresse, Courbevoie, France

Application October 19, 1934, Serial No. 749,107
In France October 30, 1933

10 Claims. (Cl. 180—9.2)

The present invention relates in general to endless track vehicles and more particularly has reference to means for facilitating the turning of the vehicle during steering thereof.

This application is directed to one of the modifications referred to in my copending application Serial No. 697,186, filed November 8, 1933.

An object of this invention is to provide means for lowering one set of the load-supporting rollers bearing on an endless track relative to the vehicle in order to concentrate the entire load of the vehicle thereon and thereby facilitate turning movements of the vehicle.

Another object of this invention is to provide means for applying the entire load of an endless track vehicle upon the load-supporting rollers positioned substantially at the center of gravity of the vehicle by effecting relative vertical movement between the chassis of the vehicle and certain of the load-supporting rollers by a mechanism actuated by the power unit of said vehicle.

Still another object of this invention is to provide a mechanism adapted to be connected and disconnected with the power unit of an endless track vehicle to effect relative movement between the chassis of said vehicle and load-supporting rollers positioned substantially at the center of gravity of said vehicle and means controlled by the steering mechanism for connecting and disconnecting said mechanism to the power unit.

With these and other objects in view, the present invention consists in the parts and combinations hereinafter described and set forth in the appended claims.

In accordance with the present invention, means are provided for mechanically shifting the load of the entire vehicle to the load-supporting rollers mounted at substantially the center of gravity of the vehicle so that during turning movements the end portions of the vehicle will not engage the ground and hinder the turning movement. In carrying out the present invention, the intermediate set of load-supporting rollers are mounted for vertical movement relative to the chassis of the vehicle and a toggle linkage is provided for effecting the relative movement between the rollers and chassis. Means are also provided for operating the toggle linkage from the drive shaft of the power unit of the vehicle and means are associated with the steering mechanism so that upon operation thereof, the toggle linkage will be actuated to facilitate turning movement of the vehicle.

As a modification the end rollers are raised to shift the load to the intermediate rollers.

In the accompanying drawings, there is shown mechanism embodying the present invention.

Figure 1 is an elevational view of a vehicle embodying the present invention.

Fig. 2 is a plan view of the vehicle shown in Fig. 1.

Fig. 3 is a view similar to Fig. 1, showing a modification of the present invention.

In Fig. 1 of the drawings, there is shown a vehicle 20 provided with endless tracks 21 extending around forward and rear wheels 22 and 23, respectively. The vehicle is also provided with the load-supporting rollers 24 which are connected to the chassis of the vehicle by equalizers 13 and associated mechanism. Three sets of carrying rollers have been shown, the end sets being affixed to the chassis of the vehicle and the intermediate set being mounted for vertical movement relative to the chassis. The equalizer 13 of the intermediate set of rollers 24 is pivotally mounted to a block 13' through which extends the vertical bar 25. In order to effect vertical movement of the block 13' on the bar 25, toggle links 9 and 12 are provided. One end of link 9 is connected to a pivot 10, which is fixed to the chassis by means of a supporting member 11. The other end of the link 9 is pivoted to a pin 8 which serves to connect link 9 with link 12 and with a drawbar or rod 7. Link 12 at its other end is pivotally connected to the block 13'. It will be realized that by moving the pin 8 laterally, the block 13' will move vertically on the bar 25.

For effecting lateral movement of the pin 8, draw-bar 7 is connected to a lever or arm 6, which is supported upon a stub shaft 6' carrying a spur gear 26 of a step-down transmission 5. A pinion 14 is mounted upon a transverse shaft 4 and meshes with the gear 26. As shown in Fig. 2 of the drawings, shaft 4 is connected by suitable gearing and a clutch 2 to the drive shaft of the vehicle. Clutch 2 is operated by a lever 3. With this mechanism, it will be appreciated that upon engaging the clutch 2, power from the drive shaft of the vehicle will be transmitted to the pinion 14 which, in rotating, will turn the lever 6 about the axis of shaft 6', and due to the connection between the end of the lever 6 and the pin 8 by the draw-bar 7, the toggle linkage will be actuated to lower the equalizer 13 on each side of the vehicle and, in effect, transfer the entire load of the vehicle to the intermediate set of rollers. When the load is so applied to the intermediate set of rollers, the vehicle may turn freely. The angle of displacement of the lever 6 is limited by the stop 16, so that the opening of the toggle linkage is limited. The length of movement is predetermined so that the toggle linkage can never be brought completely into a straight line. Upon opening, the toggle linkage moves its fixed pin 10 away from the carrying set of rollers, thus raising the vehicle for support only on the central carrying set of rollers.

It will be seen that, at this moment, all or most of the load of the vehicle is transferred to the central carrying set of rollers, thus facilitating the turning.

The above described construction also permits the load to be transferred almost entirely to the extreme sets of carrying rollers, during normal operation, the central set of rollers merely serving, so to speak, as a guide for the endless track. The suspension of the vehicle is thus improved, due to the distance apart of the points of support on the ground.

In order to render the device entirely automatic, the lever 3 for controlling the clutch may be actuated by the steering gear 17, for example by means of a small lever forming a cam 18 (Figure 2). In this way, for each movement imparted to the steering gear, there will be a corresponding raising of the vehicle by the central rollers.

It will be understood from this description and the drawings, that this device is reversible, that is to say, as soon as the pull on the rod 7 ceases, the vehicle will re-assume its original position under the action of its weight.

The device is shown diagrammatically in Figs. 1 and 2 as applied to a central set of two rollers, but it is to be understood that the number of the rollers of this set may vary more or less, according to the size of the vehicle.

Furthermore, it will be observed that a similar device may be applied in a different way, for example, instead of acting on the central set of rollers and raising the vehicle, it is possible to provide a mechanism acting on the extreme sets of carrying rollers. In this case, the effect of the mechanism will be to raise the carrying sets of rollers relatively to the chassis, instead of lowering them as in the example described hereinbefore.

In Fig. 3 a modification is shown in which the central set of rollers is fixed and the end sets movable so that they can be raised up from the ground to shift the load entirely to the central set of rollers. As shown the end sets of rollers are mounted for vertical movement and toggle links 9' and 12' are associated therewith, bars 7' connect the pins 8' of the toggle linkages with the lever 6 of the reducing transmission 5 which is connected to the drive shaft of the vehicle as shown in Figs. 1 and 2.

Upon actuating the clutch, lever 6 will move in the direction of arrow 27 and the toggle linkages will be operated to lift the end sets of rollers from the ground.

It will be seen that the final result will be of the same order since, by raising the end sets of rollers, the load will be automatically transferred to the central set of rollers.

The mechanism described here shows an example of the mechanical construction of the invention. It is evident that other mechanisms may be constructed to attain the same object.

I claim:—

1. In an endless track vehicle having a chassis, a power unit mounted thereon, a pair of spaced endless track-carrying wheels mounted on each side thereof, an endless track mounted on each side of the chassis on each pair of spaced wheels, a plurality of load-supporting rollers mounted on each side of the chassis and bearing on the ground-engaging stretches of the endless tracks, one of said rollers on each side of the vehicle being positioned approximately on a transverse line passing through the center of gravity of the vehicle, a toggle linkage for effecting vertical movement of the rollers positioned on said transverse line, means for actuating said linkage, and means for coupling the actuating means to the power unit of said vehicle.

2. In an endless track vehicle having a chassis, a power unit mounted thereon, a pair of spaced endless track-carrying wheels mounted on each side thereof, an endless track mounted on each side of the chassis on each pair of spaced wheels, a plurality of load-supporting rollers mounted on each side of the chassis and bearing on the ground-engaging stretches of the endless tracks, one of said rollers on each side of the vehicle being positioned approximately on a transverse line passing through the center of gravity of the vehicle, and steering mechanism, a toggle linkage for effecting vertical movement of the rollers positioned on said transverse line, means for actuating said linkage, means for coupling the actuating means to the power unit of said vehicle, and means controlled by the steering mechanism for actuating the coupling means.

3. An endless track vehicle comprising a chassis, a power unit, a plurality of load-supporting rollers positioned on each side of the chassis, an endless track associated with said rollers, an intermediate roller on each side lying approximately on a transverse line passing through the center of gravity of the vehicle, means for mounting said intermediate rollers for vertical movement relative to the chassis, a toggle linkage connecting each of said intermediate rollers and chassis, and means actuated by said power unit for operating said toggle linkage to effect lowering of said intermediate rollers.

4. An endless track vehicle comprising a chassis, a power unit, a plurality of load-supporting rollers positioned on each side of the chassis, an endless track associated with said rollers, an intermediate roller on each side lying approximately on a transverse line passing through the center of gravity of the vehicle, means for mounting said intermediate rollers for vertical movement relative to the chassis, a toggle linkage connecting each of said intermediate rollers and chassis, a speed reducing transmission, a shaft extending transversely of said chassis and adapted to be rocked by said transmission, levers carried by said shaft, links connecting said levers with the toggle linkages, and means for coupling said transmission to said power unit.

5. An endless track vehicle comprising a chassis, a power unit, a steering gear, a plurality of load-supporting rollers positioned on each side of the chassis, an endless track associated with said rollers, an intermediate roller on each side lying approximately on a transverse line passing through the center of gravity of the vehicle, means for mounting said intermediate rollers for vertical movement relative to the chassis, a toggle linkage connecting each of said intermediate rollers and chassis, a speed reducing transmission, a shaft extending transversely of said chassis and adapted to be rocked by said transmission, levers carried by said shaft, links connecting said levers with the toggle linkages, means for coupling said transmission to said power unit, and means controlled by the steering gear for actuating said coupling means.

6. An endless track vehicle comprising a chassis, a power unit mounted thereon, a plurality of load-supporting rollers positioned on each side of the chassis, an endless track associated with said rollers, an intermediate roller on each side lying approximately on a transverse line passing through the center of gravity of the vehicle, means for effecting relative vertical movement between certain of said rollers and the chassis to support the entire load of the vehicle on said intermediate rollers, a shaft driven by said power unit, and means for transmitting rotary motion of said shaft into vertical movement of the means for moving the rollers.

7. An endless track vehicle comprising a chassis, a power unit mounted thereon, a steering gear, a plurality of load-supporting rollers positioned on each side of the chassis, an endless track associated with said rollers, an intermediate roller on each side lying approximately on a transverse line passing through the center of gravity of the vehicle, a rotary shaft, means for effecting relative vertical movement between certain of said rollers and the chassis to support the entire load of the vehicle on said intermediate rollers, means for transmitting rotary motion of said shaft into vertical movement of the roller moving means, and means controlled by the steering gear for transmitting operating motion from said power unit to said rotary shaft.

8. An endless track vehicle comprising a chassis, a power unit, a steering gear, a plurality of load-supporting rollers positioned on each side of the chassis, an endless track associated with said rollers, an intermediate roller on each side lying approximately on a transverse line passing through the center of gravity of the vehicle, means for raising all rollers except the intermediate rollers to shift the weight of the vehicle to said intermediate rollers, and means controlled by the steering gear for coupling said raising means to said power unit.

9. An endless track vehicle comprising a chassis, a power unit, a plurality of load-supporting rollers positioned on each side of the chassis, an endless track associated with said rollers, an intermediate roller on each side lying approximately on a transverse line passing through the center of gravity of the vehicle, toggle linkages associated with the rollers near the ends of the vehicle for raising them to shift the weight of the vehicle to the intermediate rollers, and means for transmitting operating motion from said power unit to said linkages.

10. An endless track vehicle comprising a chassis, a power unit, a steering gear, a plurality of load-supporting rollers positioned on each side of the chassis, an endless track associated with said rollers, an intermediate roller on each side lying approximately on a transverse line passing through the center of gravity of the vehicle, toggle linkages associated with the rollers near the ends of the vehicle for raising them to shift the weight of the vehicle to the intermediate rollers, means for transmitting operating motion from said power unit to said linkages, and means actuated by the steering gear for controlling the transmitting means.

ADOLPHE KÉGRESSE.